US010264798B2

(12) United States Patent
Pohl et al.

(10) Patent No.: US 10,264,798 B2
(45) Date of Patent: Apr. 23, 2019

(54) BIOPOLYMER-BASED FLEXIBLE-TUBE TYPE FOOD CASING WITH INTERNAL IMPREGNATION

(71) Applicant: Kalle GmbH, Wiesbaden (DE)

(72) Inventors: Matthias Pohl, Kronberg i. Ts. (DE); Nico Michaelis, Hattersheim (DE)

(73) Assignee: Kalle GmbH, Wiesbaden (DE)

( * ) Notice: Subject to any disclaimer, the term of this patent is extended or adjusted under 35 U.S.C. 154(b) by 49 days.

(21) Appl. No.: 13/913,544

(22) Filed: Jun. 10, 2013

(65) Prior Publication Data

US 2013/0344265 A1 Dec. 26, 2013

(30) Foreign Application Priority Data

Jun. 22, 2012 (DE) ........................ 10 2012 012 484

(51) Int. Cl.
*A22C 13/00* (2006.01)
(52) U.S. Cl.
CPC ...... *A22C 13/0013* (2013.01); *A22C 13/0016* (2013.01); *A22C 2013/003* (2013.01); *A22C 2013/0046* (2013.01); *A22C 2013/0096* (2013.01); *Y10T 428/1324* (2015.01)
(58) Field of Classification Search
CPC ...... A22C 2013/0046; A22C 2013/003; A22C 2013/0096; A22C 13/0016; A22C 13/0003; A22C 13/0013; A22C 13/0046; A22C 13/0096
USPC ........ 138/118.1; 428/34.8, 35.2, 36.9, 36.91, 428/36.92; 426/105, 127, 129, 277; 206/802
See application file for complete search history.

(56) References Cited

U.S. PATENT DOCUMENTS

| 2,901,358 | A | | 8/1959 | Underwood et al. |
|---|---|---|---|---|
| 3,158,492 | A | | 11/1964 | Firth |
| 3,378,379 | A | * | 4/1968 | Shiner .................... 138/118.1 |
| 3,833,022 | A | * | 9/1974 | Turbak et al. ........... 138/118.1 |
| 3,898,348 | A | | 8/1975 | Chiu et al. |
| 4,218,286 | A | * | 8/1980 | Jones et al. ................ 162/164.3 |
| 4,228,821 | A | * | 10/1980 | Stark ........................ 137/533.11 |
| 4,248,900 | A | | 2/1981 | Hammer et al. |
| 4,543,316 | A | * | 9/1985 | Thoese ....................... 430/162 |
| 4,546,023 | A | * | 10/1985 | Kastl et al. ............... 138/118.1 |
| 4,788,087 | A | * | 11/1988 | Wilke et al. ................ 428/34.8 |
| 5,358,784 | A | | 10/1994 | Hammer et al. |
| 5,364,674 | A | | 11/1994 | Saal et al. |
| 5,405,664 | A | * | 4/1995 | Sirinyan et al. ............ 428/34.8 |
| 5,427,652 | A | * | 6/1995 | Darlington et al. ....... 162/164.3 |
| 5,480,691 | A | | 1/1996 | Hammer et al. |
| 5,595,796 | A | | 1/1997 | Hammer et al. |
| 5,811,162 | A | * | 9/1998 | Hammer ............. A22C 13/0013 138/118.1 |
| 6,083,581 | A | * | 7/2000 | Lacoste-Bourgeacq et al. ............ 428/34.8 |
| 6,395,356 | B1 | * | 5/2002 | Wielockx et al. ........... 428/34.8 |
| 6,485,802 | B1 | | 11/2002 | Hammer et al. |
| 6,703,058 | B1 | * | 3/2004 | Hammer et al. .............. 426/135 |
| 6,902,783 | B1 | * | 6/2005 | Hammer et al. ............ 428/34.8 |
| 7,968,161 | B2 | | 6/2011 | Hammer et al. |
| 8,268,129 | B2 | * | 9/2012 | Hammer et al. .............. 162/146 |
| 8,318,274 | B2 | * | 11/2012 | Hammer et al. ............ 428/34.8 |
| 2007/0014947 | A1 | * | 1/2007 | Mengel et al. .............. 428/34.1 |
| 2008/0020105 | A1 | | 1/2008 | Rieser et al. |
| 2008/0187735 | A1 | * | 8/2008 | Hammer et al. .............. 428/219 |
| 2008/0206541 | A1 | * | 8/2008 | Medoff ....................... 428/292.1 |
| 2009/0272507 | A1 | * | 11/2009 | Inaoka et al. .............. 162/164.6 |
| 2009/0288791 | A1 | * | 11/2009 | Hammer et al. .............. 162/146 |
| 2010/0003376 | A1 | | 1/2010 | Blumenberg et al. |
| 2010/0018660 | A1 | * | 1/2010 | Varnell ...................... 162/164.7 |
| 2011/0236539 | A1 | | 9/2011 | Foegler et al. |
| 2013/0344265 | A1 | * | 12/2013 | Pohl et al. .................... 428/34.8 |
| 2015/0224745 | A1 | * | 8/2015 | Morita .................... B32B 27/18 428/219 |
| 2018/0127894 | A1 | * | 5/2018 | Walther ................. D01D 5/426 |

FOREIGN PATENT DOCUMENTS

| DE | 1 492 699 | | 10/1969 | |
|---|---|---|---|---|
| DE | 1 492 708 | | 4/1972 | |
| DE | 2 227 438 | | 1/1973 | |
| DE | 28 53 269 | A1 | 6/1980 | |
| DE | 34 47 026 | A1 | 7/1985 | |
| DE | 42 33 884 | A1 | 8/1993 | |
| DE | 43 03 835 | A1 | 8/1994 | |
| DE | 4303835 | A1 * | 8/1994 | ......... A22C 13/0013 |
| DE | 10 2004 022974 | A1 | 12/2005 | |
| DE | 10 2010 012633 | A1 | 9/2011 | |
| EP | 0 006 551 | A1 | 1/1980 | |
| EP | 0 180 207 | A2 | 5/1986 | |
| EP | 0 453 925 | A1 | 10/1991 | |
| EP | 0 502 431 | A1 | 9/1992 | |
| EP | 0 635 213 | A1 | 1/1995 | |
| EP | 0 676 143 | A2 | 10/1995 | |
| EP | 0 883 308 | A2 | 12/1998 | |
| EP | 1 036 502 | A1 | 9/2000 | |
| EP | 1 732 393 | B1 | 12/2006 | |
| EP | 2 140 765 | A1 | 1/2010 | |
| GB | 109105 | * | 11/1967 | |
| GB | 2 035 842 | A | 6/1980 | |

OTHER PUBLICATIONS

Kirwan, Mark J., Food and Beverage Packaging Technology. Chinchester, West Sussex, 2011, pp. 214, 218, 221, 22, and 228.*

* cited by examiner

*Primary Examiner* — Lee E Sanderson
(74) *Attorney, Agent, or Firm* — ProPat, L.L.C.; Cathy R. Moore

(57) ABSTRACT

A biopolymer-based food casing having an impregnation on the side facing the food is provided. The impregnation includes at least one hydrophobic, synthetic, organic polymer. By taloring the impregnation, the peelability of the casing may be adjusted to correspond to the type of food contained within the casing. The casing is used, especially, as an artificial sausage casing for raw sausage, scalded-emulsion sausage or cooked-meat sausage.

20 Claims, No Drawings

BIOPOLYMER-BASED FLEXIBLE-TUBE TYPE FOOD CASING WITH INTERNAL IMPREGNATION

CROSS-REFERENCE TO RELATED APPLICATIONS

This application claims priority to German Patent Application No. 10 2012 012 484.8 filed Jun. 22, 2012, which is hereby incorporated herein by reference in its entirety.

FIELD OF THE INVENTION

The invention relates to a biopolymer-based flexible-tube type food casing which has an impregnation on the inside with which the adhesion of the casing to the food may be established. The casing is provided, in particular, as an artificial sausage casing.

BACKGROUND OF THE INVENTION

An important feature in food casings, especially in sausage casings, is their peelability. The casings should adhere sufficiently firmly to the food in order that no fat can collect between the casing and the surface of the food. However, they should also not adhere too firmly, in order that they can be peeled off, without components of the food surface being torn out in the course of this. The adhesion depends strongly here on the type of food or sausage variety. For instance, blood sausage, for example, adheres particularly strongly to the casing. In addition, the type of ripening process (duration of ripening, temperature and atmospheric humidity during ripening) also has an influence on the adhesion. The material of the casing (regenerated cellulose, collagen, thermoplastic starch, etc.), optionally with a reinforcement of fiber paper, nonwoven or textile, is also of importance.

In the prior art, a multiplicity of impregnations and coatings are described for the various sausage types and casing types. The impregnations in this case contain adhesion components, release components or a combination of the two. Thus, casings for dry sausage should adhere sufficiently firmly to the sausage emulsion during the entire manufacturing period and also exhibit sufficient shrinkage in order that no creases form. For this purpose, reactive and non-reactive adhesion components have proved to be effective. Those that are suitable as non-reactive adhesion components are, for example, gelatin, casein or chitosan. The effect of the non-reactive adhesion components can be reinforced if they are crosslinked to the surface of the casing using at least bifunctional reagents, such as glyoxal or glutardialdehyde.

As reactive adhesion components, polyamide-polyamine-epichlorohydrin resins (DE 14 92 708) and urea or melamine/formaldehyde resins (EP 0 883 308; U.S. Pat. No. 3,378,379) have been used. Also, synergistically acting combinations of reactive and non-reactive adhesion components have also been described (EP 0 883 308, EP 2 140 765).

The impregnation with adhesion components can lead to an undesirable sticking together of the insides of the flexible-tube type casing. This can be reduced or suppressed by adding natural or synthetic oils, or fatty acids, in particular those having a chain length of 4 to 10 carbon atoms.

In order to facilitate the stripping of the casing after the end of the ripening process, various release components have been described with which the inside of the casing is impregnated. Here also, a distinction may be made between reactive and non-reactive release components.

The non-reactive release components include ionic and nonionic polysaccharides and polysaccharide derivatives, in particular cellulose, cellulose ethers (methylcellulose, hydroxyethylcellulose, carboxymethylcellulose, etc.), alginic acid or alginates (EP 0 502 431), starch and starch ethers (EP 0 006 551). This category also includes phosphoglycerides and fluorinated polymers such as polytetrafluoroethylene (EP 0 635 213).

Reactive peeling components are bound by covalent bonds to the material of the casing. Particularly effective peeling components have proved to be trivalent chromium fatty acid complexes (U.S. Pat. No. 2,901,358) and dialkyl ketenes having long-chain alkyl substituents (DE 14 92 699).

The effect of reactive and non-reactive release components can be further enhanced by combination with natural or synthetic oils (such as paraffin oil, silicone oil or MCT oil), fats or fatty acids or waxes (such as montan wax, beeswax or carnauba wax) (EP 0 180 207, DE 22 27 438, DE 34 47 026).

Internal impregnations with a combination of release components and adhesion components are also known. Thus, for example, in EP 0 676 143 (=U.S. Pat. No. 5,595,796) a combination of (i) a natural protein, an aminoplast precondensate or a polyamine/polyamide/epichlorohydrin resin and (ii) a chromium fatty acid complex or an alkyl ketene dimer is disclosed. A combination of cellulose ether and reactive resin, such as polyamine/polyamide/epichlorohydrin resin or a melamine/formaldehyde resin, is described in DE 28 53 269. EP 1 732 393 relates to a sausage casing having minimal emulsion adhesion, which casing is impregnated on the inside with a combination of a chromium fatty acid complex, a wax, a polyamine/polyamide/epichlorohydrin resin, a protein and/or an alkyl ketene dimer.

Despite the multiplicity of the previously proposed internal impregnations, until now no actually satisfactory solution has been found which meets all the requirements. Thus, blood sausages, raw sausages and sausage types of particularly lean meat exhibit very strong adhesion to casings made of biopolymers, in particular to casings based on cellulose. The peeled-off casing then frequently exhibits undesirable adhesions of sausage emulsion. In the case of foods having particularly low adhesion to the casing, the peeling components can, on the other hand, effect an unwanted detachment of the casing. In the resultant intermediate space, mold formation can then readily occur. Reactive peeling components, such as alkyl ketene dimers, additionally require a relatively long time period in order to react with the surface of the casing made of the biopolymers. The time period is additionally highly influenced by temperature and pH.

Non-reactive release components, such as cellulose ethers, are in addition readily extracted out by dissolution on soaking the casings. This leads later to an unsatisfactory or non-uniform adhesion of the casing. Anionic polyelectrolytes, such as carboxymethylcellulose and alginates, very readily form complexes with divalent ions, such as $Ca^{2+}$ or $Mg^{2+}$, which originate from the food. These complexes can then form undesirable gel-like deposits on the surface of the food. Many reactive adhesion components, but also many cellulose ethers, can stick the insides of the casing to one another, which considerably interferes with the stuffing operation.

SUMMARY OF ADVANTAGEOUS EMBODIMENTS OF THE INVENTION

The object was therefore to avoid the disadvantages described and to finish a biopolymer-based food casing in such a manner that it exhibits sufficient, but not excessive, adhesion. The adhesion properties shall, in addition, be able to be adjusted in a targeted manner. Also, the impregnation shall not be washed out in the event of soaking the casing before stuffing.

The object was achieved with an inner impregnation which contains specific hydrophobizing synthetic organic polymers as essential component. Preferably, the polymers comprise groups which can participate in ionic and/or covalent bonds with the biopolymers of the food casing.

DETAILED DESCRIPTION OF ADVANTAGEOUS EMBODIMENTS OF THE INVENTION

The present invention therefore relates to a biopolymer-based food casing which has an impregnation on the side facing the food, wherein the impregnation comprises at least one hydrophobic, synthetic, organic polymer ("hydrophobizing polymer") selected from the group consisting of polystyrene, styrene/(meth)acrylate copolymers, styrene/maleate copolymers, styrene/butadiene copolymers, polyurethanes, polyacrylonitriles, polyisoprene, polyacrylamide, poly (meth)acrylates, polyvinylpyrrolidone, polyvinylidene chloride, ethylene/vinyl acetate copolymers, polyvinyl acetate, polyvinyl alcohol or optionally N-substituted polyvinylamines.

In a preferred embodiment, said (co)polymers are each modified with cationic, anionic or amphiphilic groups. These are, for example, ammonium groups, carboxyl or carboxylate groups, or sulfonic acid groups. The expression "copolymer", therefore, in the context of the present invention, should also be taken to mean polymers of more than 2 different polymer units.

The substituents optionally present in the polyvinylamines are preferably alkyl groups or acyl groups.

Preferred cationically modified (co)polymers contain quaternary ammonium groups having a charge equivalent of 400 to 1500 g/eq. $N^+$.

Preferred anionically modified (co)polymers contain carboxylate or sulfonic acid groups having a charge equivalent of 400 to 4000 g/eq. $COO^-$ or $SOC_3^-$.

The expression "biopolymers", in the context of the present invention, shall be taken to mean polysaccharides, proteins and also mixtures thereof. These are, in particular, cellulose, starch, alginic acid, polylactic acid, collagen, gelatin and also derivatives thereof, such as starch acetate.

The biopolymer-based food casing optionally comprises a fiber reinforcement, for example made of a textile material, a nonwoven or a fiber paper. A particularly preferred fiber reinforcement consists of a paper made of hemp fibers or abaca fibers. The fiber reinforcement is generally completely embedded in a matrix of the biopolymers, and therefore does not form the inner surface of the casing. A reinforcement of fiber paper, embedded in a matrix of regenerated or precipitated cellulose, is contained in the long-known "cellulose fiber skins". The fiber paper generally has a weight from 15 to 31 $g/m^2$, preferably from 18 to 29 $g/m^2$. Reinforcements made of textile or nonwoven can also have a higher weight, for example they have a weight from 15 to 60 $g/m^2$, preferably from 20 to 50 $g/m^2$. The reinforcements made of textile or nonwoven can likewise consist of biopolymers, for example of natural fibers, such as cotton or silk. They can also consist of fibers made of synthetic plastics, for example of polyester fibers or polyamide fibers. They can also consist of mixtures of natural fibers and plastics fibers.

The food casing according to the invention is preferably of flexible tubular type, particularly preferably seamless flexible tubular type. In a particular embodiment, a fiber reinforcement is shaped to form a flexible tube having overlapping longitudinal edges and then coated from the inside, from the outside or from both sides continuously and without gaps with a solution of the biopolymer or a derivative of the biopolymer. Such a casing is also termed seamless.

The hydrophobic, synthetic, organic polymers preferably comprise polymer units of styrene, styrene derivatives, (meth)acrylic acid, (C1-C18)alkyl esters of (meth)acrylic acid, maleic anhydride, butadiene, vinylpyrrolidone, vinyl alcohol, vinyl acetate, vinyl ether, or of various combinations of said foregoing monomers. It can therefore concern homopolymers or copolymers, wherein "copolymers" shall also be taken to mean those having more than two different monomer units. "(Meth)acrylic acid" in this case represents "acrylic acid and/or methacrylic acid". The same applies to "(meth)acrylate", etc. Those which are particularly suitable are, for example, styrene/acrylate copolymers, styrene/butadiene copolymers, styrene/maleic anhydride copolymers, polyvinylpyrrolidone and polyurethanes. The polymers to be used according to the invention may be processed in a broad pH range, they have a high electrolyte tolerance and generally also have a good film-forming capacity.

In a particular embodiment, the polymers comprise monomer units having ionic groups, for example quaternary ammonium groups, or sulfo groups. Suitable monomer units are derived, for example, from (3-trimethylammoniopropyl)methacrylate or (1-methyl-1-sulfoethyl)methacrylamide. The ionic groups effect an additional ionic bond with the biopolymers of the casing. These comprise hydroxyl groups (e.g. in polysaccharides), carboxyl groups (e.g. in alginic acid/alginate), amide groups (e.g. in proteins) and other functional groups. Maleic anhydride or isocyanate groups can react with hydroxyl groups of the biopolymers, wherein covalent bonds are formed. The ionic and/or covalent bonds prevent extraction of the hydrophobizing polymers by washing.

By modification of the fractions of the individual monomers and/or by variation of the substituents in the monomer units, the degree of hydrophobization and therefore the adhesion properties of the casing may be adjusted over a wide range and adapted to the respective food. The higher, for example, is the fraction of styrene units, the more hydrophobic and thus more readily peelable is the casing. Also, the adhesion properties may be set via the length of the alkyl groups in the (meth)acrylic acid-alkyl ester units. The longer the alkyl radical, the more effectively is the hydrophobization of the surface. In the case of casings which are provided for fatty foods, polymers or copolymers having hydrophilic groups can markedly improve the peelability. Hydrophilic groups are, in particular, quaternary ammonium groups, or carboxylated or sulfated groups. In casings for low-fat foods, in contrast, styrene/(meth)acrylate copolymers having an elevated fraction of styrene monomers, rather, are suitable.

The hydrophobizing polymers used in the present invention develop their full action immediately, and the casings can correspondingly be used directly. In contrast thereto, casings impregnated with alkyl ketene dimers must first be stored for a relatively long time until the full action is established.

Suitable hydrophobizing polymers are available, for example, under the name POLYGRAPHIX® (anionic, amphoteric or cationic dispersions from Kemira), PHOBO- LAN® B (styrene/acrylate copolymers from Cebra Chemie GmbH), PERGLUTINE® (anionic, amphoteric or cationic styrene/(meth)acrylate copolymers from BK Giulini), PVP/VA® (Ashland Specialty Ingredients) or AQUACOAT® (anionic styrene/butadiene copolymer from Synthomer GmbH).

In a particularly preferred embodiment, the hydrophobizing polymers are combined with anionic or cationic promoters, corresponding to the charge of the hydrophobizing polymers. Then, the hydrophobizing polymers are better attracted to the casing surface and are in addition more strongly anchored, which in addition improves their effect. Suitable cationic promoters are, for example, polyethyleneimines, chitosan, cationic starch, polyvinylamines or poly(diallyldimethylammonium chloride) (PolyDADMAC); suitable anionic promoters are, in particular, carboxymethylcellulose, polyacrylic acid, alginate or pectins. The fraction of these promoters is generally 0.1 to 4.0% by weight, preferably 0.2 to 2.0% by weight, in each case based on the weight of the hydrophobizing polymers.

Cellulose hydrate-based flexible-tube type sausage casings which, on the outside, have a coating of polyacrylates or copolymers with acrylate units are known from EP 1 036 502. The coating serves to decrease the permeability of the casing to water vapor and oxygen, in order that it is also useable for liver sausage. The use of polymers in an inner coating for setting the adhesion properties is not obvious, in the EP document, rather, it is advised not to impregnate or coat the inside.

The hydrophobic, synthetic, organic polymers can be used alone or in combination with other adhesion or release components. These are, for example, cellulose ethers, alkyl ketene dimers, polyamide/polyamine/epichlorohydrin resins, proteins and other known substances mentioned in the introduction.

CMC in this case can take on a "dual role". At low concentrations (<0.1 g/m$^2$, to 4% by weight, based on solids content of the hydrophobizing polymers) it acts as a promoter for improved retention to the biopolymer surface. At larger concentrations, it affects the peelability of the casing up to an "easy peel" effect.

The hydrophobizing, synthetic, organic polymers are expediently applied in the form of aqueous solutions or aqueous dispersions. The dispersions can have a solids content of up to 50% by weight, based on the total weight thereof. Expediently, the fraction of the hydrophobizing polymers in the solution or dispersion is 1 to 40% by weight, preferably 10 to 40% by weight, in each case based on the total weight of the solution or dispersion. The dispersed polymer particles generally have a very low median diameter of preferably less than 0.05 μm. The particles can therefore be better and more uniformly attracted to the casing made of biopolymers.

The solution or dispersion is preferably applied to the inside of the flexible-tube type food casing by what is termed a bubble coating or slug coating process. In this case, solution or dispersion is passed through the entire casing in a constantly newly forming loop. Thereafter, the casing is dried, expediently in the inflated state, with hot air and/or infrared radiation.

The impregnation for setting the peeling properties generally comprises 0.1 to 3.0 g/m$^2$, preferably 0.4 to 1.5 g/m$^2$, of hydrophobizing polymers. The amount of hydrophobizing polymers is selected in each case such that they are not extracted by dissolving even by soaking for several hours.

An at first completely clear water used in this case demonstrates, after soaking for 2 hours, a turbidity of less than 5 NTU.

That is markedly less than in the external coating provided as a gas barrier of the liver sausage casing according to EP 1 036 502. There, the external coating has a thickness from 3 to 10 μm, corresponding to about 3 to 10 g/m$^2$. The impregnation according to the present invention, in addition, does not form a continuous layer on the inside, the dispersed polymer particles, rather, penetrate into the pores of the casing formed from biopolymers.

In addition to the internal impregnation, the casing according to the invention can also be coated or impregnated on the outside. By means of the impregnation on the outside, it is possible, depending on the composition thereof, to decrease the resistance, for example, of the casing to cellulytic enzymes (cellulases), as are formed by mold fungi, or to increase the roughness of the exterior.

In a particular embodiment, said hydrophobic, synthetic, organic polymers are metered into the coating viscose. In the case of "double-viscosed" cellulose fiber skins, they are preferably mixed with the fiber reinforcement formed into the flexible tube for coating the interior. After the regeneration, they are then firmly anchored in the cellulose hydrate matrix. Expediently, an aqueous solution and/or dispersion of the polymers is added to the viscose, as is also used for the internal impregnation. In comparison with the internal impregnation, the weight fraction of hydrophobic polymers per surface unit of the casing is increased in order that a sufficient amount thereof is present on the interior for setting the peeling properties. The fraction of hydrophobizing polymers is expediently about 5 to 40% by weight, preferably 10 to 20% by weight, in each case based on the dry weight of the regenerated cellulose.

The examples hereinafter serve to illustrate the invention. Percentages therein are taken to mean percentages by weight unless stated otherwise or is directly clear from the context. The peeling properties of the casings were rated with scores from 0 to 4, wherein 0 represents "virtually no adhesion" and 1 "very readily peelable"; 4 means a very strong adhesion. The degree of adhesion of the hydrophobizing polymers was determined on the basis of the turbidity of the water used for soaking the casings. The casings in this case were placed for 2 hours in clear water, thereafter the turbidity of the water was measured. The measurement was performed as specified in DIN ISO 7027, using a formazin standard. A turbidity value of 5 to 50 NTU means a slightly turbid water, values greater than 50 NTU mean a markedly turbid water (NTU=Nephelometric Turbidity Unit). In casings having impregnations of non-reactive peeling components, such as CMC, wax dispersions or oil dispersions, the water, after 1 hour, exhibited a turbidity value of up to 43 NTU.

Example 1

An externally-viscose cellulose fiber skin having a nominal caliber of 65 mm, after the plasticizer tub (this contained an aqueous glycerol solution), was impregnated on the interior by bubble coating with 10 liters of an aqueous solution of the following composition:
  1.0 l of a dispersion which contains 39% of a styrene/acrylic ester copolymer (PHOBOLAN® B, Cebra Chemie GmbH) in water, based on the weight of the dispersion,
  0.4 l of glycerol and
  8.6 l of demineralized water (VE water).

The impregnated gel skin then passed through a squeeze-roll pair. Then the skin was inflated, in the inflated form dried in a hot-air dryer and wound up to form rolls. The roll product was then finished to form shirred sticks. The shirred sticks were soaked for 2 hours with clear water. The water after the 2 hours exhibited a turbidity value of 4 NTU, which indicates virtually clear water. Therefore, virtually no components were dissolved out of the casing, which could cause turbidity.

The amount of copolymer was 0.2 g per square meter of casing.

Thereafter, the casings were stuffed on an automated stuffing machine with meat sausage emulsion. The sausages were cooked, cooled to 4° C. core temperature and frozen. Subsequently thereto the sausages (with casing) were cut into slices. The casing in this case remained adhering to the individual slices. When a casing was used having a customary adhesion impregnation (protein or gelatin), in contrast, in 23% of the sausage slices, the casing was partially or completely removed by dissolution.

In a test peeling by hand, the peeling properties were assessed with the score 3.

Example 2

A cellulose fiber skin, as described in example 1, after it had passed through the plasticizer tub (this contained an aqueous glycerol solution), was impregnated on the interior with an aqueous dispersion of the following composition:
- 1.7 l of a dispersion which contains 19% of a cationic styrene/acrylate copolymer (PERGLUTIN® K418, BK Giulini GmbH) in water,
- 0.5 l of glycerol and
- 7.8 l of VE water.

As described in example 1, the cellulose fiber skin was then dried and finished. The casing was impregnated with 0.3 g/m² of the cationic styrene/acrylate copolymer.

The skin was then stuffed in the same manner with meat sausage emulsion and the sausages were cooked. The water used for soaking the fiber skins, after 2 hours of soaking, exhibited a turbidity of 3 NTU, which corresponds to clear water. Therefore no components had been removed by dissolution which could cause turbidity.

After the sausages were cooled to a core temperature of 4° C., the sausages were then frozen.

The casing was able to be stripped without problems, the peeling properties were assessed with the score 1. The surface of the sausage emulsion remained undamaged in the course of this.

When a similar casing was used without internal impregnation, the casing, in contrast, remained adhering to the emulsion and parts were torn out of the sausage emulsion.

Example 3

A double-viscosed (=viscosed from the inside and from the outside) cellulose fiber skin having a nominal caliber of 50 mm was impregnated as described in example 1 on the interior with 10 liters of an aqueous dispersion of the following composition:
- 2.5 l of a 24% strength dispersion of an amphoteric styrene/acrylate copolymer (PERGLUTIN® 450/280, BK Giulini GmbH) in water,
- 0.5 l of glycerol,
- 1.5 l of a 16% strength dispersion of a polyamide/polyamine/epichlorohydrin resin in water and
- 5.5 l of VE water.

Further processing proceeded as described in example 1. The casing was impregnated with 0.5 g/m² of the amphoteric styrene/acrylate copolymer and 0.2 g/m² of the polyamide/polyamine/epichlorohydrin resin. However, it was not shirred to form shirred sticks, but finished to form 50 cm-long sections. These were soaked for 1.5 h and then stuffed with salami emulsion. The water used for soaking remained clear (4 NTU after removal of the soaked casings). After ripening for several weeks under optimum conditions, the casing showed minimum emulsion adhesion, but it had not detached. It was able to be readily stripped without damaging the emulsion surface in this case (peeling score: 1.5).

Example 4

A double-viscosed cellulose fiber skin of nominal caliber 50 mm was, as described in example 1, impregnated on the interior with 10 liters of an aqueous dispersion of the following composition:
- 3.0 l of a 19% strength dispersion of a cationic acrylate copolymer (PERGLUTIN® K418, BK Giulini GmbH) in water,
- 0.5 l of glycerol and
- 6.5 l of water.

After drying, the impregnated casing was finished to form sections each having a length of 1.3 m. These were impregnated internally with 0.6 g/m² of the cationic acrylate copolymer. The sections were soaked for 1.5 hours and then stuffed with pepperoni emulsion. The sausages were heated to a core temperature of 54° C., then cooled, smoked, and ripened for 2 weeks.

After the ripening period, the casing was peeled off using compressed air. For this purpose, compressed air was added between casing and emulsion surface until the casing detached from the emulsion without bursting in the course of this and was able to be stripped off readily.

The adhesion of the casing to the emulsion was very low; shortly before the end of the ripening period, it already started to detach (peeling score: 0). No mold had formed between the casing and the emulsion surface.

Example 5

A cellulose fiber skin viscosed on both sides and having a nominal caliber of 110 mm was impregnated on the interior with 20 liters of an aqueous dispersion of the following composition:
- 5.0 l of a 39% strength dispersion of a styrene/acrylate copolymer (PHOBOLAN® B, Cebra Chemie GmbH) in water,
- 1.0 l of glycerol,
- 3.0 l of a 7.6% strength aqueous AQUAPEL® suspension and
- 11.0 l of VE water.

After the drying, the impregnated cellulose fiber skin (0.97 g of styrene/acrylate copolymer per square meter) was finished to form shirred sticks. These were soaked for 2 hours with clear water before stuffing in order to make them more supple. Subsequently thereto, the casings were stuffed with meat (lean) for boiled ham. After the boiling, the casing was able to be stripped off without problem from the meat (peeling score: 1). A similar casing that was not internally impregnated, in contrast, demonstrated a very much stronger adhesion to the meat (peeling score: 2.5).

Example 6

An externally viscosed cellulose fiber skin having a nominal caliber of 60 mm was, as described in example 1, impregnated on the interior with 10 l of an aqueous dispersion of the following composition:

2.0 l of a 52% strength dispersion of an anionic styrene/butadiene copolymer (AQUACOAT® 100, Synthomer GmbH) in water,
0.5 l of glycerol and
7.5 l of VE water.

After drying, the casing was finished to form sections each of 50 cm in length, soaked, and then stuffed with a semilong-life product (Bierwurst). The sections were impregnated with 1.1 g/m² of the anionic styrene/butadiene copolymer. The water used for soaking remained clear (4 NTU).

When the sausage was ripened, no disconnection of the casing was observed. The peeling properties were rated at 2. A similar, but non-internally impregnated cellulose fiber skin exhibited, in comparison thereto, an uneven emulsion adhesion (peeling score: 1.5 to 2.5).

That which is claimed:

1. A biopolymeric sausage casing which has an impregnation on the side facing the sausage, said impregnation comprising styrene/(meth)acrylate copolymer as hydrophobic, synthetic, organic polymer which comprises groups participating in ionic bonds, covalent bonds or both ionic and covalent bonds with the biopolymers of the sausage casing,
wherein the impregnation establishes the adhesion of said casing to the sausage, determines peeling properties of said casing and comprises 0.2 to 1.5 g/m² of hydrophobic, synthetic, organic polymers as sole film formers and said impregnation does not form a continuous layer.

2. The sausage casing as claimed in claim 1, wherein the biopolymer is a polysaccharide, a polysaccharide derivative, a protein, a protein derivative, or a mixture thereof.

3. The sausage casing as claimed in claim 2, wherein the polysaccharide comprises cellulose, starch or a starch derivative and/or alginic acid.

4. The sausage casing as claimed in claim 2, wherein the protein comprises collagen, gelatin and/or derivatives thereof.

5. The sausage casing as claimed in claim 1, wherein said sausage casing further comprises a fiber reinforcement.

6. The sausage casing as claimed in claim 5, wherein said fiber reinforcement comprises a textile material, a nonwoven, or a fiber paper.

7. The sausage casing as claimed in claim 1, wherein the styrene/(meth) acrylate copolymer is a cationic styrene/alkyl (meth)acrylate.

8. The sausage casing as claimed in claim 7, wherein at least some alkyl groups of the cationic styrene/alkyl (meth) acrylate copolymer are substituted with quaternary ammonium groups.

9. The sausage casing as claimed in claim 1, wherein the impregnation comprises 0.4 to 1.5 g/m² of hydrophobic, synthetic, organic polymers.

10. A raw sausage, scalded-emulsion sausage or cooked-meat sausage casing comprising a sausage casing as claimed in claim 1.

11. A biopolymeric sausage casing as claimed in claim 1, wherein said casing further comprises (i) cellulose as the biopolymer; (ii) fiber paper as a fiber reinforcement and (iii) polyethyleneimine as an optional promoter.

12. A biopolymeric sausage casing as claimed in claim 1, wherein the impregnation on the side facing the sausage comprises hydrophobic, synthetic, organic polymer consisting of styrene/(meth)acrylate copolymer.

13. A biopolymeric sausage casing as claimed in claim 1, wherein the copolymer is either (i) modified with cationic or anionic groups, with the cationically modified copolymer containing quaternary ammonium groups having a charge equivalent of 400 to 1500 g/eq N⁺ and the anionically modified copolymer containing carboxylate or sulfonic acid groups having a charge equivalent of 400 to 4000 g/eq $COO^-$ or $SO_3^-$ or (ii) contains maleic anhydride or isocyanate groups that react with hydroxyl groups on the biopolymer.

14. A biopolymeric sausage casing as claimed in claim 1, wherein said impregnation does not comprise wax.

15. A biopolymeric sausage casing which has an impregnation on the side facing the sausage, said impregnation comprising styrene/(meth)acrylate copolymer as hydrophobic, synthetic, organic polymer which comprises groups participating in ionic bonds, covalent bonds or both ionic and covalent bonds with the biopolymers of the sausage casing,
wherein the impregnation establishes the adhesion of said casing to the sausage, determines peeling properties of said casing and comprises 0.2 to 1.5 g/m² of hydrophobic, synthetic, organic polymers as film formers and said impregnation does not form a continuous layer, wherein the hydrophobic, synthetic, organic polymer consists essentially of styrene/(meth)acrylate copolymer and is combined with an anionic or cationic promoter, which is present in an amount ranging from 0.1 to 4.0% by weight, based upon the weight of the hydrophobizing polymer.

16. The sausage casing as claimed in claim 15, wherein the anionic or cationic promoter is a polyethyleneimine, chitosan, polyvinylamine, cationic starch, poly(diallyldimethylammonium chloride), polyacrylic acid, alginate, pectin or carboxymethyl cellulose.

17. The sausage casing as claimed in claim 15, wherein the fraction of the promoter is 0.5 to 2.0% by weight, based on the weight of the hydrophobic, synthetic, organic polymer.

18. A biopolymeric food casing which has an impregnation on the side facing the food, said impregnation comprising styrene/(meth)acrylate copolymer as a hydrophobic, synthetic, organic polymer participating in ionic bonds, covalent bonds or both ionic and covalent bonds with the biopolymers of the food casing, the impregnation establishing adhesion of said casing to the food and determining the peeling properties of said food casing, said hydrophobic, synthetic, organic polymer applied onto the casing in the form of polymer particles having a median diameter of less than 0.05 micron,
wherein said food casing comprises pores such that the impregnation penetrates into the pores of the casing and does not form a continuous layer.

19. A process for producing a sausage casing as claimed in claim 1, wherein said process comprises the following steps:
providing a biopolymeric flexible-tube food casing,
providing an aqueous dispersion comprising at least one hydrophobic, synthetic, organic polymer,
impregnating the inside of the flexible-tube food casing with the aqueous dispersion by bubble coating and
drying the impregnated flexible-tube food casing.

20. A process for producing a sausage casing as claimed in claim 19, wherein said drying step comprises drying said impregnated flexible-tube food casing in an inflated state.

* * * * *